A. L. SMITH.
OPTOMETER.

No. 249,685. Patented Nov. 15, 1881.

Attest.
Ch. A. F. Simon
Jas. Chase

Inventor.
Andrew L. Smith
per R. F. Osgood,
Atty.

UNITED STATES PATENT OFFICE.

ANDREW L. SMITH, OF GENEVA, NEW YORK.

OPTOMETER.

SPECIFICATION forming part of Letters Patent No. 249,685, dated November 15, 1881.

Application filed August 28, 1879.

*To all whom it may concern:*

Be it known that I, ANDREW L. SMITH, of Geneva, Ontario county, New York, have invented a certain new and useful Improvement in Eye-Testers; and I do hereby declare that the following is a full, clear, and exact description of the same, reference being had to the accompanying drawings, in which—

Figure 1:
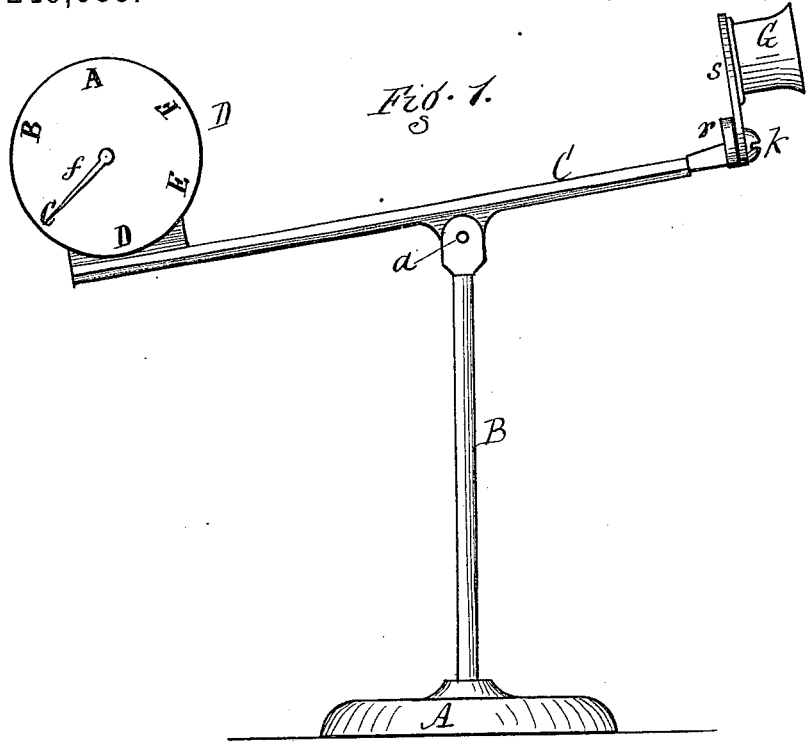
Figure 2:
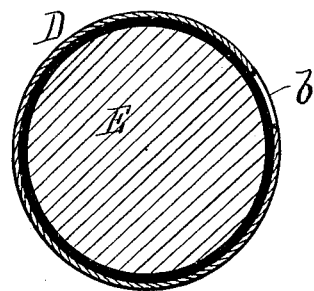
Figure 3:
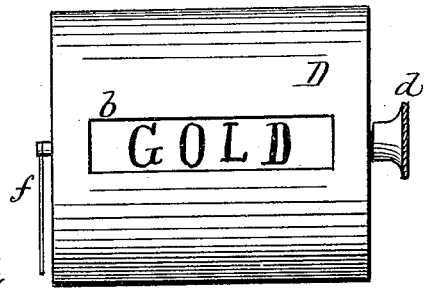
Figure 4:
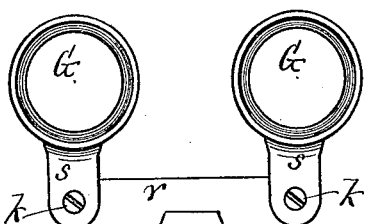

Figure 1 is a side elevation of the instrument. Fig. 2 is a cross-section of the roller and its inclosing-case. Fig. 3 is an exterior view of the case, looking toward the slot. Fig. 4 is an end elevation, showing the adjustable eye-pieces.

My improvement relates to an instrument for testing the focal distance of the eyes preparatory to fitting spectacles or eyeglasses to the same.

The invention consists of an instrument constructed, arranged, and operating as hereinafter more fully described.

In the drawings, A represents the base of the instrument.

B is a standard, which rises from the base to any suitable height.

C is an arm, which is pivoted at $a$ to the top of the standard, so as to be adjusted by a swinging movement to any desired position. It is tightened by a set-screw.

D is a short cylindrical case attached to the arm C at one end. It is closed, with the exception of a longitudinal slot, $b$, which comes within the line of sight.

E is a roller situated within the case, having journals which turn in the ends of the case. On one end is a thumb-piece, $d$, or an equivalent crank, by which the roller is turned from the outside, and on the other end is a pointer or hand, $f$, which moves over a scale of letters or figures on the end of the case, said letters or figures representing the different focal sizes of the lenses to be fitted to the eye. I prefer to use letters which correspond with certain cards or lists having the numbers of the lenses marked thereon; but, if desired, the numbers of the lenses may be marked directly upon the case and form the scale. Said scale is represented by A, B, C, &c. On the periphery of the roller are a series of types, words, or other characters of graduated sizes, from a coarse down to a fine size, and these are arranged in consecutive order, so that as the roller is revolved within the case they will be brought in succession to the slot $b$, to be seen from the outside.

G G are two eye-tubes attached to a cross-head, $r$, of the arm C at the opposite end from the case and roller. The bearings $s\ s$ of the eye-tubes are pivoted at $k\ k$, so that they can be thrown apart or moved toward each other to fit eyes of persons of different widths apart. Instead of being pivoted, the eye-tubes may be made to slide.

In using the instrument the person looks through the eye-tubes G G and toward the slot $b$. The roller is turned, bringing the types or words in succession to said slot, gradually reducing the size of the words till the smallest size that the person can clearly distinguish is reached. The roller is then stopped, and the pointer $f$, which has moved with the roller over the scale, will indicate on said scale the letter corresponding with the approximate number of the lenses adapted to the eye.

This instrument is adapted to persons afflicted either with myopia or presbyopia, or any other defect of vision requiring glasses.

What I claim as new is—

An instrument for testing eyes consisting of a standard, B, arm C, eye-tubes G G, roller E, and slotted case D, the roller provided with a series of types, words, or other characters of graduated sizes on its periphery, and having a pointer, $f$, which moves over a scale on the case to indicate the different focal numbers of the lenses, as herein shown and described.

In witness whereof I have hereunto signed my name in the presence of two subscribing witnesses.

ANDREW L. SMITH.

Witnesses:
R. F. OSGOOD,
JACOB SPAHN.